Patented July 14, 1925.

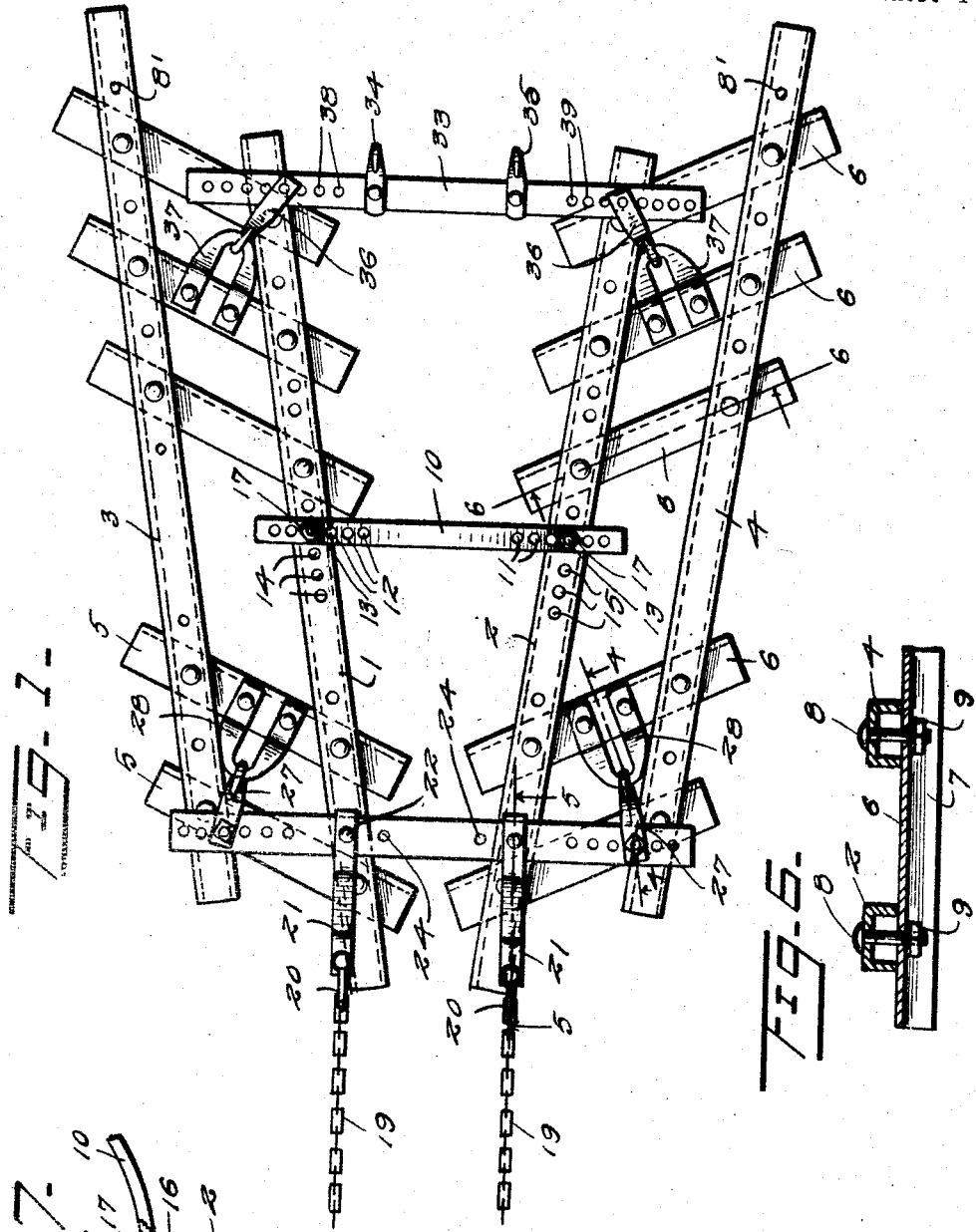

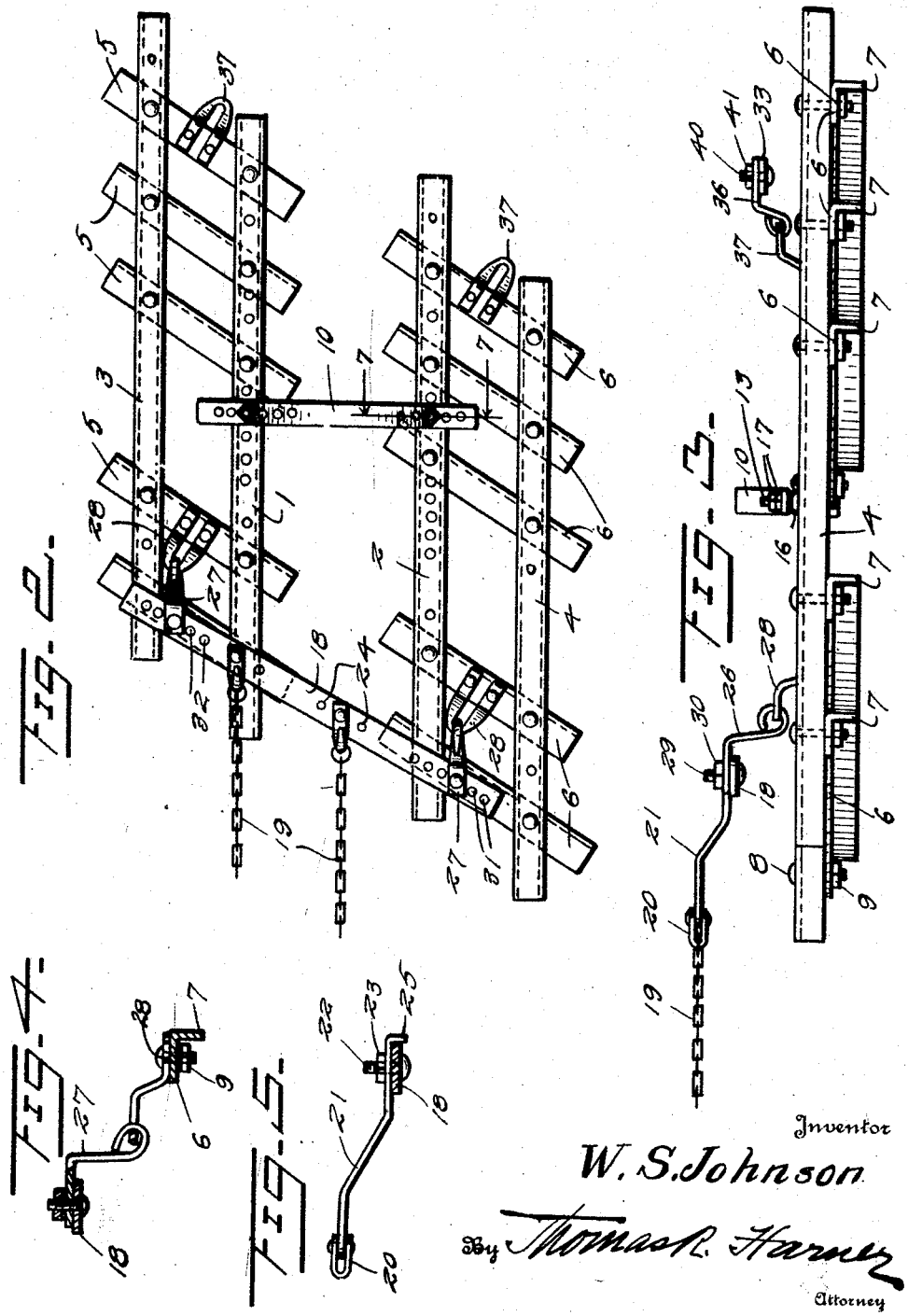

1,545,775

UNITED STATES PATENT OFFICE.

WILLIAM S. JOHNSON, OF WACO, TEXAS.

DRAG.

Application filed January 5, 1925. Serial No. 561.

*To all whom it may concern:*

Be it known that I, WILLIAM S. JOHNSON, a citizen of the United States of America, residing at Waco, in the county of McLennan and State of Texas, have invented certain new and useful Improvements in Drags, of which the following is a specification.

My present invention relates to improvements in drags or implements for use in roadway or highway building. The primary object of my invention is the provision of an implement of this character which may with facility and convenience be readily adapted for various uses in grading and leveling the road and in spreading and sweeping material on the road surface in order that the road may be built and maintained in first class condition.

These objects are accomplished by so constructing the implement that it may flex to conform to the road surface, and its parts may be adjusted to locate the scraper blades in various positions relative to the direction of travel of the implement or to the longitudinal surface of the roadway.

The invention consists in certain novel combinations and arrangements of parts as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a top plan view of the implement of my invention with the scraper blades adjusted or set in position for spreading and leveling the road material.

Figure 2 is a plan view of the implement with parts adjusted to position for the purpose of sweeping to the right the loose material such as rocks and other obstructions.

Figure 3 is a view in side elevation of the implement as shown in Figure 1.

Figure 4 is a detail sectional view at line 4—4 of Figure 1.

Figure 5 is a detail sectional view at line 5—5 of Figure 1.

Figure 6 is a detail sectional view at line 6—6 of Figure 1.

Figure 7 is a detail view showing the flexible connection at one end of the transverse brace bar.

Various other arrangements or adjustments of the parts of the implement may be made in addition to the examples shown in Figures 1 and 2, as for instance the implement as shown in Figure 1, instead of being drawn to the left to spread the material from the center of the road, may be drawn to the right to gather material toward the center of the road way or the surface being treated. In Figure 2 where the longitudinal beams are arranged in parallelism, the parts may be changed by positioning the inner pair of beams in advance of the outer pair, while in parallelism, in order that loose material may be spread laterally at both sides of a central space.

In carrying out my invention I utilize a pair of inner beams 1 and 2 and a complementary pair of outer beams 3 and 4 all of which are preferably made up of channel irons or channel bars with their channels at the underside. These beams as indicated are disposed longitudinally of the implement and are capable of use in parallel positions as indicated, and also adapted for arrangement on lines converging in the direction of the line of travel of the implement as well as on lines diverging from the line of travel of the implement.

The four beams are connected in pairs to form two sections or side frames of the implement having a flexible connection between them, and two sets of scraper blades 5 and 6 are employed in connection with the two sections as parts thereof.

The blades are standardized as to form and shape and preferably are made up in similar size of angle irons, of which the flange 7 of each blade forms the scraper for contact with and travel over the surface being treated.

The longitudinal beams are each provided with bolt holes as are also the scraper blades of the two sets of blades and fastening bolts 8 are passed through the registering holes in the beams and blades, with nuts 9 beneath the blades for securely clamping the blades to the beams.

For accomplishing various kinds of road work the beams may be arranged in different positions, and the scraper blades, each of which is connected to a pair of beams, are bolted to the pair of beams to form rigid side sections of the implement.

The two inner beams of the implement are connected by an intermediate brace bar 10 disposed transversely of the implement and located at the approximate center thereof. This bar is fashioned with two series of bolt holes 11 and 12 near its ends and the center of the bar is preferably arched for the purpose of elevating it from the ground. Bolts 13 are utilized to secure the brace bar at its ends to the beams and these bolts pass through selected bolt holes 11 and 12 in the bar and also through selected holes of a series 14 or 15 in the beams 1 and 2 respectively.

To insure flexibility between the brace bar and the two beams to which it is connected, and thus permit the two frame sections to conform to the surface of the roadway, as for instance the crown of a roadway, I may use washers 16 having rounded heads. These washers are interposed between the beams and the ends of the brace bar, and nuts 17 on the bolts are locked on the bolts in such manner as to permit the necessary flexing movement between the brace bar and the side sections of the frame.

At the front of the implement I utilize an adjustable, transversely disposed draft bar or equalizing bar 18 to which horse power or tractor machine power may be attached by means of the two draft chains 19 which are connected by clevises 20 to the draw links 21. The links 21 are secured by bolts 22 and nuts 23 to the draft bar, which is provided with suitable bolt holes 24 for selective use with the links and the links at their ends may have flanges 25 overlapping the rear edge of the draft bar to retain the links in proper position.

The draft bar is flexibly connected to the implement by means of links 26 and 27 that are coupled to the yokes 28 and the yokes are bolted or riveted to the scraper bar as 5 and 6, one at each side of the machine or implement.

The links 26 are secured by bolts 29 and nuts 30 in selected bolt holes 31 and 32 arranged in two series near the ends of the draft bar.

At the rear of the implement in Figure 1 a second draft bar 33 is provided which may be used when the implement is to be drawn to the right in Figure 1. This auxiliary draft bar 33 has draft hooks 34 and 35 to which the horse power or tractor power is applied and its ends are loosely coupled each to a frame section by means of the links 36 and yokes 37. Two series of bolt holes 38 and 39 are used in connection with bolts 40 and nuts 41 for securing these flexible coupling members to the auxiliary draft bar.

The implement is capable of various adjustments as to its parts, and it will be apparent that the scraper blades of the respective side sections may be arranged in various selected angles to the line of travel of the implement. This is accomplished by first removing the bolts 8 from the bolt holes 8' in the beams and then arranging the beams in the desired or required relative positions, as for instance in Figs. 1 and 2. Then the scraper blades are located in proper position relative to the beams of their respective side sections and secured by their bolts in rigid position.

As indicated in Figure 1 the blades may be used to spread material laterally from the center of the roadway when the implement travels to the left, or to gather and level the material to build up the center of the roadway, when the implement travels toward the right.

The blades in Figure 2 are arranged to sweep loose material to the right of the roadway and it will be apparent that the movement of the implement may be reversed to sweep material to the opposite side of the roadway. Or the blades themselves may be re-adjusted as to their diagonal position with respect to the beams.

The blades may be disposed transversely of the beams and of the roadway or they may be disposed at various angles to the beams and roadway, but whether transversely or diagonally disposed, they are at all times rigid with their side frames.

With the blades arranged in the opposed positions of Figure 1 the resistance to the forward movement of the drag is uniform, and any tendency of the drag to swing is prevented. The draft power is of course applied at the proper points on the draft bar to equalize the pull on the implement.

It will be noted that the draft bar is elevated while the flexible connections or couplings between the bar and the respective side sections of the implement are applied to the scraper blades below the level of the beams and close to the ground. The links 21 and 26 thus impose a downward pull on the front part of the implement, and this leverage or pull on these links effectively retains the front portion, as well as the rear portion of the implement on the ground to insure uniformity in the action of the drag as the scraper blades pass over the surface of the ground.

The draw bar 18 may be moved laterally of the implement and the attaching links coupled at selected holes 31 and 32 to equalize the pull and compensate for strains imposed on various parts of the implement by the adjustment of the blades. The flexible connection of the draw bar, in addition to equalizing the pull on the implement, permits automatic adjustment of the two side sections to the surface of the ground or roadway. This flexible connection also facilitates turning of the implement, allowing the outside section to advance while the inside section is retarded during the turning movement.

The load and capacity of the implement may be varied according to the nature of the work to be performed. When the work is heavy the effective scraping surface of the implement may be reduced, and when the work is light the effective working surface of the implement may be increased, by adjusting the relative positions of the blades.

Having thus fully described my invention, what I claim as new and desire to secure by Letters Patent is—

1. A drag comprising two pairs of beams having bolt holes and scraper blades having bolt holes and bolts securing said blades to the respective pairs of beams to form side sections, a transverse draft bar having an adjustable flexible connection to a scraper blade of each section, and an adjustable transverse brace bar having flexible connections with the adjoining beams of said sections.

2. A drag comprising two pairs of beams having bolt holes, scraper blades having bolt holes and bolts securing said blades to the respective pairs of beams to form side sections, a transverse draft bar having two series of bolt holes and links bolted to said draft bar, a yoke on a blade in each section loosely connected with the respective links, means for applying power to said draft bar, an adjustable transverse brace bar having two sets of bolt holes therein, the adjoining beams of the sections each having a series of bolt holes, and bolts at the ends of said brace bar having loose connections with said adjoining beams.

In testimony whereof I have affixed my signature.

WILLIAM S. JOHNSON.